H. COAD.
WHEEL WEEDER HOE.
APPLICATION FILED DEC. 21, 1917.
1,270,787.
Patented July 2, 1918.
2 SHEETS—SHEET 2.
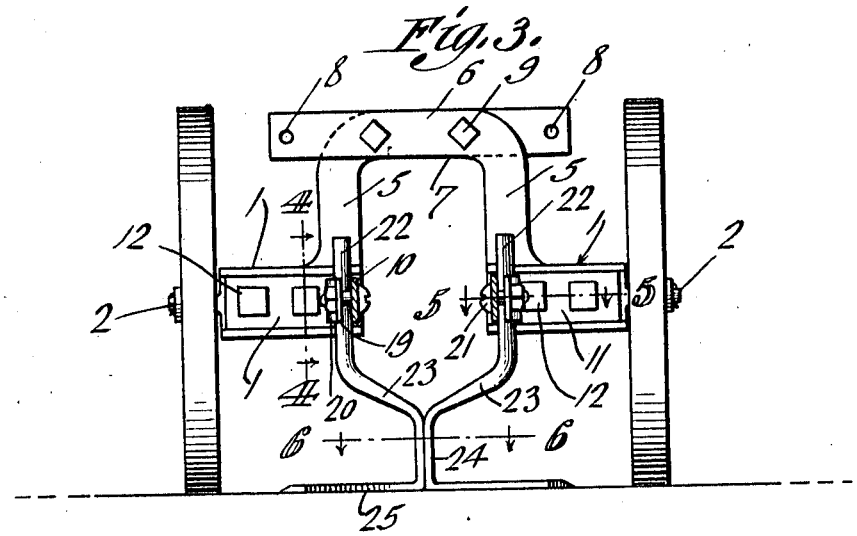
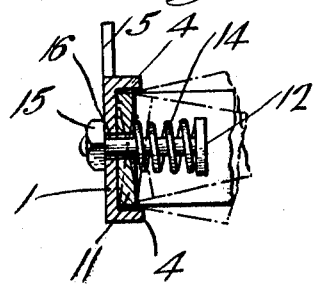
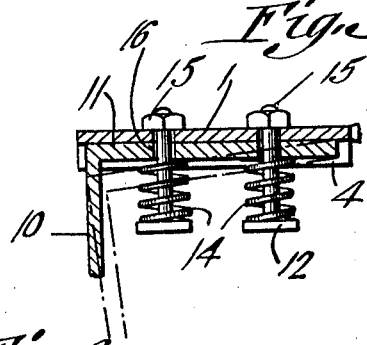
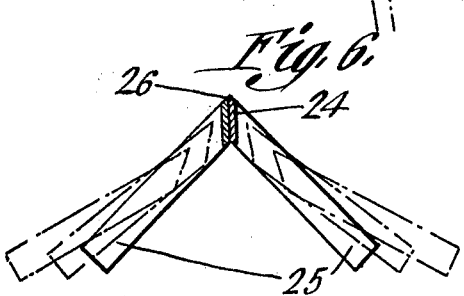
H. Coad
Inventor

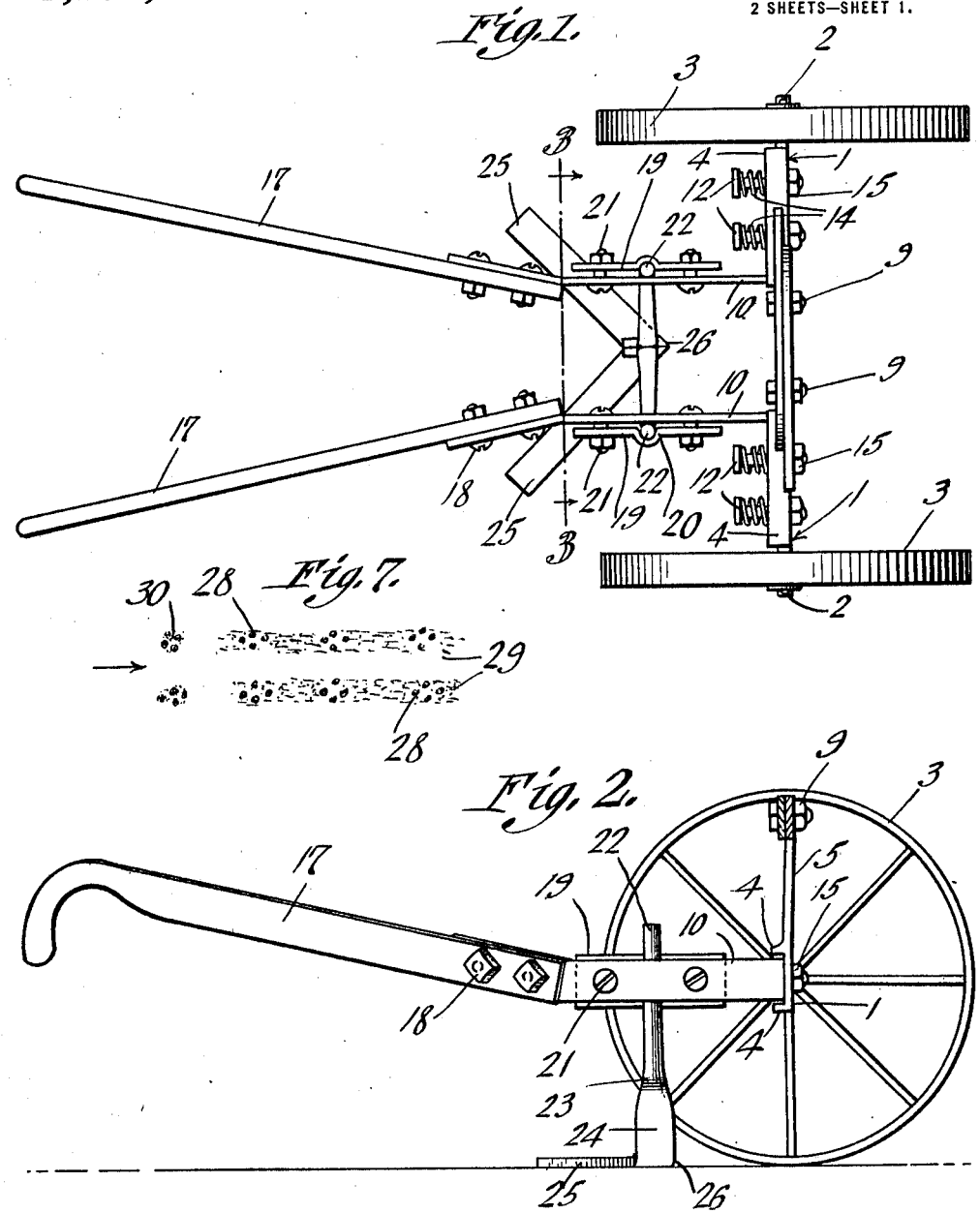

UNITED STATES PATENT OFFICE.

HENRY COAD, OF AINSWORTH, NEBRASKA.

WHEEL WEEDER-HOE.

1,270,787.
Specification of Letters Patent.
Patented July 2, 1918.

Application filed December 21, 1917. Serial No. 208,261.

*To all whom it may concern:*

Be it known that I, HENRY COAD, a citizen of the United States, residing at Ainsworth, in the county of Brown and State of Nebraska, have invented a new and useful Wheel Weeder-Hoe, of which the following is a specification.

By way of explanation it may stated that when a cultivator passes between rows of standing plants, for the purpose of eradicating weeds, the plants of each row remain in a belt or zone of weeds not swept away by the cultivator as it passes between the rows, it being practically impossible to provide a cultivator which, moving between the rows, will trim close to the plants in each row and clear out the weeds completely between the plants in each row.

In view of the foregoing, one object of the invention is to provide a straddle-row cultivator, the constituent weed cutters of which normally are in contact at their forward ends, the cutters, therefore, clearing out the weeds between the plants of each row, and it being possible to separate the cutters, at the will of an operator, so that the cutters, having cleared out the weeds behind a plant, may pass around the plant, meet again in front of the plant, and eradicate the weeds in front of the plant.

Specifically, it is the object of the invention to provide novel means whereby the supports which carry the cutters are connected with the frame of the cultivator in such a way that the cutters may be spread apart to pass on opposite sides of a plant, and be tilted with respect to the horizontal, thereby to regulate the depth at which the cutters work.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings:

Figure 1 shows in top plan, a machine constructed in accordance with the present invention;

Fig. 2 is a vertical longitudinal section of the cultivator;

Fig. 3 is a cross section taken approximately on the line 3—3 of Fig. 1, the weed cutters remaining in elevation;

Fig. 4 is a section taken strictly on the line 4—4 of Fig. 3, distant parts being omitted and parts appearing in elevation;

Fig. 5 is a section on the line 5—5 of Fig. 3, remote parts being omitted;

Fig. 6 is a section taken on the line 6—6 of Fig. 3, and showing how the weed cutters may be spread apart at the will of an operator.

Fig. 7 is a diagrammatic view illustrating the operation of the machine.

The cultivator forming the subject matter of this application includes a carrying frame comprising a pair of horizontal axles 1 having spindles 2 on their outer ends, whereon ground wheels 3 are journaled. The axles 1 are provided, adjacent their upper and lower edges, with rearwardly extended flanges 4. The inner ends of the axles 1 merge into vertical arms 5 having overlapping horizontal extensions 6, the parts 5 and 6 forming an arch 7 through which the standing plants are adapted to pass. The extensions 6 are supplied with openings 8 receiving securing devices 9, to the end that a lateral expansion of the carrying frame may be brought about in the well known way, to vary the gage of the wheel tread.

The invention comprises a pair of rearwardly extended horizontal supports 10 having angular ends 11 which project outwardly, the ends being disposed approximately at right angles to the body portions of the supports. The ends 11 of the supports 10 fit closely but movably between the flanges 4 of the axles 1. In the axles 1 and in the ends 11 of the supports 10, enlarged openings 16 are fashioned. Securing devices 12, preferably bolts, pass through the openings 16. Nuts 15 are threaded on the bolts 12, and bear against the forward surfaces of the axles 1, the heads of the bolts being spaced from the rear faces of the ends 11 of the supports 10. Compression springs 14 surround the bolts 12, the rear ends of the springs bearing against the heads of the bolts, and the forward ends of the springs bearing against the ends 11, so as to hold the same yieldingly against the axles 1, between the flanges 4. Rearwardly extended grips 17 are secured at 18 to the supports 10. Clamps 19 coact with the supports 10 and are provided with recesses 20, the clamps being attached to the supports by means of bolts 21 or the like.

Standards 22 are provided, the standards having, at their lower ends inwardly extended arms 23, terminating in vertical end portions 24 carrying laterally and outwardly extended weed cutters or blades 25, the weed cutters 25 being disposed in rearwardly converging relation, and the weed cutters being extended a short distance in front of the parts 24 to define a point 26, the parts 24 being an abutment, during the normal operation of the cultivator, as disclosed in Fig. 3. The standards 22 are received in the recesses 20 of the clamps 19 and the clamps, together with the bolts 21, bind the standards adjustably against the supports 10, it being possible to raise or lower the standards, and consequently to raise or lower the weed cutters 25, by loosening the bolts 21.

The ends 11 of the supports 10 are connected to the axles 1 in such a way that the parts 24 abut, the forward portions of the weed cutters 25 defining the point 26, as above explained.

Noting Fig. 7 of the drawings it will be understood that after a cultivator has passed between two rows of standing plants, indicated at 28, each of the rows still remains within a zone or strip of weeds indicated at 29. When the cultivator forming the subject matter of this application is drawn along, the parts 24 being in abutment, and the point 26 remaining intact, the strip of weeds shown at 29 will be eradicated, between the separate plants 28, so that, after the cultivator has passed, each plant will be substantially divested of surrounding weeds, as shown at 30 in Fig. 7, the arrow in Fig. 7 indicating the direction of advance of the cultivator. When the point 26 approaches a plant, the operator presses the grips 17 apart, the ends 11 of the supports 10 tilting in horizontal plane, as shown in Fig. 5, and sliding on the bolts 12, the springs 14 being put under compression. By this procedure, the operator spreads the weed cutters 25 apart as indicated in Fig. 6 in dotted line, and separates the parts 24, so that the same may pass around a standing plant. When the outward pressure on the grips 17 is released, the springs 14 restore the cutters 25 to the position of Figs. 1 and 3, so as to clean out the weeds between the plant which has been passed and the next plant in advance. It is possible to swing the grips 17 upwardly and downwardly, thus tilting the ends 11 of the supports 10 vertically on the bolts 2, as shown in Fig. 4. In this way the angle between the cutters 25 and the horizontal may be varied, the depth at which the cutters operate being changed accordingly. During each of the tilting operations shown in Figs. 4 and 5, the flanges 4 on the axles 1 form a guiding and reinforcing means for the ends 11 of the supports 10, the bolts 12 being loosely mounted in the openings 16.

For convenience in claiming the invention, the members 10 and 17 may be alluded to as "handles."

Having thus described the invention, what is claimed is:

1. In a walking cultivator, a carrying frame; rearwardly extended supports having angular ends coöperating with the frame, the ends and the frame having enlarged openings; securing devices loosely mounted in the openings and provided with heads; compression springs about the securing devices and coöperating with the heads, the springs constituting means for holding the ends of the supports yieldingly in parallel relation to the frame; rearwardly extended grips carried by the supports; and laterally acting cutters assembled with the supports.

2. In a walking cultivator, a carrying frame having upper and lower flanges; rearwardly extended supports having angular ends mounted to tilt vertically and horizontally between the flanges; means for connecting the ends of the supports yieldably with the frame; rearwardly extended grips carried by the supports; and laterally acting cutters assembled with the supports.

3. A walking cultivator comprising a carrying frame; rearwardly extended handles; weed cutters secured to the handles intermediate the front and rear ends of the handles and disposed to the rear of the frame, the inner ends of the cutters being disposed in meeting relation; and means for securing the forward ends of the handles on the frame movably, to permit a horizontal separation of the cutters by means of the handles.

4. A walking cultivator comprising a carrying frame; rearwardly extended handles; weed cutters secured to the handles intermediate the front and rear ends of the handles and disposed to the rear of the frame, the inner ends of the cutters being disposed in meeting relation; and means for securing the forward ends of the handles to the frame movably, to permit a lateral separation of the handles and the cutters, and to permit a vertical adjustment of the handles and the cutters.

In testimony that I claim the foregoing as my own, I have hereto affixed my signature in the presence of two witnesses.

HENRY COAD.

Witnesses:
R. M. HERRE,
JOHN W. BARR.

Copies of this patent may be obtained for five cents each, by addressing the "Commissioner of Patents, Washington, D. C."